(12) United States Patent
Fujimoto et al.

(10) Patent No.: US 10,137,555 B2
(45) Date of Patent: Nov. 27, 2018

(54) WORKPIECE MACHINING METHOD

(71) Applicants: The University of Tokyo, Tokyo (JP); DMG MORI CO., LTD., Nara (JP)

(72) Inventors: Hiroshi Fujimoto, Tokyo (JP); Satoshi Fukagawa, Tokyo (JP); Shinji Ishii, Nara (JP); Yuki Terada, Nara (JP)

(73) Assignees: THE UNIVERSITY OF TOKYO, Tokyo (JP); DMG Mori Co., Ltd., Nara (JP)

( * ) Notice: Subject to any disclaimer, the term of this patent is extended or adjusted under 35 U.S.C. 154(b) by 189 days.

(21) Appl. No.: 15/059,597

(22) Filed: Mar. 3, 2016

(65) Prior Publication Data
US 2016/0256977 A1    Sep. 8, 2016

(30) Foreign Application Priority Data
Mar. 6, 2015 (JP) ................................. 2015-044852

(51) Int. Cl.
*B24B 49/00* (2012.01)
*B24B 37/005* (2012.01)
*B24B 37/20* (2012.01)

(52) U.S. Cl.
CPC ............ *B24B 37/005* (2013.01); *B24B 37/20* (2013.01); *B24B 49/006* (2013.01); *G05B 2219/41256* (2013.01); *G05B 2219/49077* (2013.01)

(58) Field of Classification Search
None
See application file for complete search history.

(56) References Cited

U.S. PATENT DOCUMENTS

| | | | |
|---|---|---|---|
| 8,944,885 B2* | 2/2015 | Yanase | B23F 23/00 451/21 |
| 9,651,936 B2* | 5/2017 | Fujimoto | G05B 19/404 |
| 9,846,428 B2* | 12/2017 | Fujimoto | G05B 19/4163 |
| 2011/0169440 A1* | 7/2011 | Fujishima | G05B 19/416 318/561 |
| 2012/0225609 A1* | 9/2012 | Yanase | B23F 23/00 451/11 |

(Continued)

FOREIGN PATENT DOCUMENTS

| | | |
|---|---|---|
| JP | S49105277 | 10/1974 |
| JP | 2000-126991 A | 5/2000 |
| JP | 2012-091283 A | 5/2012 |

*Primary Examiner* — Timothy V Eley
(74) *Attorney, Agent, or Firm* — Miller, Matthias & Hull LLP

(57) ABSTRACT

A machine tool includes a spindle retaining a tool, a spindle motor, a feed device relatively moving a workpiece and a tool with a feed motor, a spindle motor control unit, and a feed motor control unit. In a method of machining a workpiece with the machine tool, the spindle motor control unit continuously varies a rotational speed of the spindle in a periodic or non-periodic manner with a predetermined amplitude with respect to a target rotational speed. The feed motor control unit continuously varies a relative moving speed between the tool and the workpiece in synchronization with the spindle motor such that a ratio of the rotational speed of the spindle to the moving speed does not become constant at least in a predetermined time zone in which a spindle speed reaches a maximal value and a predetermined time zone in which the spindle speed reaches a minimal value.

3 Claims, 5 Drawing Sheets

(56) References Cited

U.S. PATENT DOCUMENTS

| | | | |
|---|---|---|---|
| 2015/0160643 A1* | 6/2015 | Fujimoto | G05B 19/404 700/159 |
| 2015/0168938 A1* | 6/2015 | Fujimoto | G05B 19/4163 700/160 |
| 2016/0161936 A1* | 6/2016 | Lee | B23Q 15/013 700/173 |

* cited by examiner

WORKPIECE MACHINING METHOD

BACKGROUND

Field of the Disclosure

The present disclosure relates to a machine tool and a workpiece machining method, which are able to effectively suppress chatter vibration in machining a workpiece.

Background of the Disclosure

It has been well known that, when a workpiece is machined using a machine tool, chatter vibration deteriorates machining accuracy (in particular, surface accuracy). Such chatter vibration is roughly classified into forced chatter vibration and self-excited chatter vibration, and it is considered that forced chatter vibration is caused by an action of an excessively large external force or by synchronization between a frequency of an external force and a resonance frequency of a vibrating system and, on the other hand, self-excited chatter vibration is caused by continuation of cutting in which periodic variation in cutting resistance and periodic variation in thickness of cut enhance each other through interaction therebetween (the so-called "regeneration effect").

Further, as a machining method in which self-excited chatter vibration is suppressed, there has been proposed a machining method in which the rotational speed of the spindle is varied in a periodic manner with a predetermined amplitude with the feed speed of the tool being fixed; such a machining method is disclosed in Japanese Unexamined Patent Application Publication Nos. S49-105277; 2000-126991; and 2012-091283. In each of the machining methods disclosed in the Japanese patent documents noted above, the rotational speed of the spindle is varied with predetermined amplitude and period in order to break periodicities of variation in cutting resistance and variation in thickness of cut, and, as a manner for varying the rotational speed of the spindle in a periodic manner, there has been proposed such a manner that the rotational speed of the spindle is varied in the form of a triangular wave or in the form of a sinusoidal wave.

SUMMARY OF THE DISCLOSURE

However, although the above-described conventional machining method as disclosed in the Japanese patent documents noted above provides suppression effect to some extent for self-excited chatter vibration, according to a new finding the present inventors have obtained, the conventional machining method has a problem that self-excited chatter vibration cannot always be sufficiently suppressed.

That is, when the spindle motor is controlled in order to vary the rotational speed of the spindle (that is, the spindle motor) in the form of a triangular wave as described above, as shown in FIG. 7, peaks A of the triangular wave, at which the control waveform has a maximum value, are points where the variation of the rotational speed of the spindle motor (spindle rotation speed) is changed from increasing variation to decreasing variation. Therefore, the actual rotational speed of the spindle motor cannot follow such a rapid variation and therefore follows the variation with delay; consequently, the actual rotational speed of the spindle motor is varied along a convex curve as indicated by a broken line. The same is applied to bottoms B of the triangular wave, at which the rotational speed of the spindle motor reaches a minimum value; the actual rotational speed of the spindle motor (spindle rotation speed) at the bottoms B is varied along a concave curve as indicated by a broken line.

Thus, the variation rate of the rotational speed is very small near the points where the actual spindle rotation speed reaches the maximum value (the peaks of the convex curves indicated by the broken lines) and the points where the actual spindle rotation speed reaches the minimum value (the bottoms of the concave curves indicated by the broken lines). Therefore, the action of breaking the above-described regeneration effect (that is, periodicities of variation in cutting resistance and variation in thickness of cut) is weakened, in other words, sufficient suppression effect for self-excited chatter vibration is not obtained, near the maximum value and the minimum value.

FIG. 8(a) is a graph showing a control waveform for spindle rotation speed in machining in which a rectangular parallelepiped workpiece is fixed on a table of a vertical machining center, an end mill is retained by a spindle, and four side surfaces of the workpiece is machined, while FIG. 8(b) is a diagram showing acceleration acting on the spindle in the machining. Note that, as shown in FIG. 8(a), the control waveform for the spindle rotation speed is designed to be in the form of a triangular wave in a predetermined section from before to after transition from machining of a first side surface to machining of a second side surface and a predetermined section from before to after transition from machining of a third side surface to machining of a fourth side surface and be constant in the other sections.

As shown in FIG. 8(b), chatter vibration occurs when the workpiece is machined with the spindle rotation speed constant. Further, even when the controlled rotational speed of the spindle is varied in the form of a triangular wave, large vibration occurs at portions corresponding to the peaks of the triangular wave. Furthermore, also at the other portions, vibration itself occurs even though the amplitude thereof is small.

As understood from FIG. 8, designing the control waveform for the spindle rotation speed in the form of a triangular wave provides self-excited chatter vibration suppression effect to some extent; however, it cannot necessarily be said that the suppression effect is sufficient.

The same is applied to the case where the control waveform for the spindle rotation speed is designed in a sinusoidal wave. That is, as shown in FIG. 9, also in this case, the variation rate of the spindle rotation speed is very small near peaks C where the spindle rotation speed reaches a maximum value and bottoms D where the spindle rotation speed reaches a minimum value. Therefore, near the maximum value and the minimum value, the action of breaking the above-described regeneration effect (that is, periodicities of variation in cutting resistance and variation in thickness of cut) is weakened; consequently, self-excited chatter vibration cannot be sufficiently suppressed, similarly to the case where the spindle rotation speed is varied in the form of a triangular wave.

The present disclosure has been achieved in view of the above-described circumstances, and an object thereof is to provide a machine tool and a machining method, which can sufficiently effectively suppress self-excited chatter vibration as compared with the conventional art.

The present disclosure, for solving the above problem, relates to a machining method of machining a workpiece with a machine tool, the workpiece being machined by retaining a tool on a spindle, rotating the spindle at a target rotational speed, and relatively moving the workpiece and the tool at a target moving speed to a target moving position in a cutting feed direction, that is, a so-called milling method using a rotary tool, a rotational speed of the spindle being varied in a waveform having a predetermined amplitude and continuously changing in a periodic or non-periodic manner with respect to the target rotational speed, and a relative moving speed between the tool and the workpiece being continuously varied in synchronization with the variation of the rotational speed of the spindle in such a manner that a ratio of the rotational speed of the spindle to the relative moving speed does not become constant, at least in a predetermined time zone including a point where the rotational speed of the spindle reaches a maximal value and a predetermined time zone including a point where the rotational speed of the spindle reaches a minimal value.

This machining method can be carried out appropriately by a machine tool according to the present disclosure having the configuration described below.

That is, the machine tool according to the present disclosure includes a spindle retaining a tool, a spindle motor rotating the spindle, a feed device having a feed motor and relatively moving a workpiece and the tool in a cutting feed direction, and a controller having a spindle motor control unit controlling the spindle motor and a feed motor control unit controlling the feed motor, the spindle motor control unit being configured to receive a command for a target rotational speed of the spindle and control the spindle motor to continuously vary a rotational speed of the spindle in a periodic or non-periodic manner with a predetermined amplitude with respect to the target rotational speed, and the feed motor control unit being configured to receive commands for a relative target moving position and a target moving speed for the tool and the workpiece, control the feed motor to relatively move the tool and the workpiece at the received target moving speed to the target moving position, and control the feed motor in synchronization with the control of the spindle motor by the spindle motor control unit to continuously vary a relative moving speed between the tool and the workpiece in such a manner that a ratio of the rotational speed of the spindle to the relative moving speed does not become constant, at least in a predetermined time zone including a point where the rotational speed of the spindle motor reaches a maximal value and a predetermined time zone including a point where the rotational speed of the spindle motor reaches a minimal value.

According to the machine tool of the present disclosure, after a tool is retained by the spindle, the spindle motor is controlled by the spindle motor control unit to rotate the spindle, and the feed motor of the feed device is controlled by the feed motor control unit to relatively move the tool and the rotary tool in a cutting feed direction, whereby the workpiece is machined.

In this process, the spindle motor control unit receives a command for a target rotational speed of the spindle and controls the spindle motor to continuously vary a rotational speed of the spindle in a periodic or non-periodic manner with a predetermined amplitude with respect to the target rotational speed. The control waveform for varying the rotational speed of the spindle may be a curved waveform such as a sinusoidal wave or may be a linear waveform such as a triangular wave (including a triangular wave having rounded peaks); however, it shall be a continuously varying waveform.

On the other hand, the feed motor control unit receives commands for a relative target moving position and a target moving speed for the tool and the workpiece, and controls the feed motor so that the tool and the workpiece are relatively moved at the received target moving speed to the target moving position, and controls the feed motor in synchronization with the control of the spindle motor by the spindle motor control unit to continuously vary a relative moving speed between the tool and the workpiece in such a manner that a ratio of the rotational speed of the spindle to the relative moving speed does not become constant at least in a predetermined time zone including a point where the rotational speed of the spindle reaches a maximal value and a predetermined time zone including a point where the rotational speed of the spindle reaches a minimal value.

Thus, according to this machine tool and this machining method, since the rotational speed of the spindle is controlled to be continuously varied in a periodic or non-periodic manner with a predetermined amplitude with respect to a target rotational speed, self-excited chatter vibration can be sufficiently suppressed similarly to the conventional art in a time zone except a predetermined time zone from before to after the rotational speed of the spindle reaches a maximal value and a predetermined time zone from before to after the rotational speed of the spindle reaches a minimal value.

That is, as described above, self-excited chatter vibration is suppressed by breaking periodicity of variation in cutting resistance acting on a tool (in other words, cutting speed), which is one of the factors of the regeneration effect. Therefore, in the time zone except the above-described predetermined time zones, because variation in the rotational speed of the spindle is sufficiently large, a relative moving speed between an edge of the tool and the workpiece, in other words, cutting speed at which the edge of the tool cuts the workpiece, that is, cutting resistance acting on the tool, is greatly varied even if the feed speed for feeding the tool is constant, whereby the above-described periodicity of variation in cutting resistance is lost and consequently self-excited chatter vibration is suppressed.

Further, in the predetermined time zone including the point where the rotational speed of the spindle reaches a maximal value and the predetermined time zone including the point where the rotational speed of the spindle reaches a minimal value, relative moving speed between the tool and the workpiece is continuously varied in such a manner that the ratio of the rotational speed of the spindle to the relative moving speed does not become constant, whereby self-excited chatter vibration is sufficiently effectively suppressed.

As described above, not only in the case where the control waveform for varying the rotational speed of the spindle motor is a curved waveform, also in the case where it is a linear waveform such as a triangular wave, the actual rotational speed of the spindle motor is varied along a curve due to tracking delay in the predetermined time zone including the point where the rotational speed of the spindle reaches a maximal value and the predetermined time zone including the point where the rotational speed of the spindle reaches a minimal value; therefore, the variation rate of the spindle rotation speed in these time zones is very small. Therefore, variation in cutting seed at which the edge of the tool cuts the workpiece (that is, cutting resistance) is small near the maximal value and the minimal value, which makes the periodicity of the variation in cutting resistance, which is one of the factors of the regeneration effect, difficult to lose. Consequently, it is difficult to suppress self-excited chatter vibration.

Accordingly, in the present disclosure, a relative moving speed between the tool and the workpiece is continuously varied in such a manner that the ratio of the rotational speed of the spindle to the relative moving speed does not become constant in the predetermined time zone including the point where the rotational speed of the spindle reaches a maximal value and the predetermined time zone including the point where the rotational speed of the spindle reaches a minimal value, whereby a situation is produced in which cutting speed at which the edge of the tool cuts the workpiece (that is, cutting resistance acting on the tool) is greatly varied. Thereby, periodicity of variation in cutting resistance is lost and this makes it possible to sufficiently effectively suppress self-excited chatter vibration. Note that, in order to produce the situation in which the cutting resistance is varied, it is essential to continuously vary the relative moving speed between the tool and the workpiece in such a manner that the ratio of the rotational speed of the spindle to the relative moving speed does not become constant.

Thus, the machine tool and the machining method according to the present disclosure are able to suppress self-excited chatter vibration more effectively than the conventional art. Note that the predetermined time zones in which the relative moving speed between the tool and the workpiece is varied can be empirically determined so that self-excited chatter vibration is sufficiently effectively suppressed.

Further, in the machining method according to the present disclosure, the waveform for varying the rotational speed of the spindle may be a triangular wave and at the same time the relative moving speed between the tool and the workpiece in the predetermined time zones may be varied in the form of a triangular wave. Further, in order to carry out such a machining method, the machine tool may have a configuration in which the spindle motor control unit is configured to control the spindle motor in such a manner that the rotational speed of the spindle is varied in the form of a triangular wave and the feed motor control unit is configured to control the feed motor in such a manner that the relative moving speed between the tool and the workpiece is varied in the form of a triangular wave in the predetermined time zones.

Further, in the machining method according to the preset disclosure, the waveform for varying the rotational speed of the spindle may be a sinusoidal wave and at the same time the relative moving speed between the tool and the workpiece in the predetermined time zones may be varied in the form of a sinusoidal wave. Further, in order to carry out such a machining method, the machine tool may have a configuration in which the spindle motor control unit is configured to control the spindle motor in such a manner that the rotational speed of the spindle is varied in the form of a sinusoidal wave and the feed motor control unit is configured to control the feed motor in such a manner that the relative moving speed between the tool and the workpiece is varied in the form of a sinusoidal wave in the predetermined time zones.

Further, the present disclosure relates to a machining method of machining a workpiece with a machine tool, the workpiece being machined by retaining the workpiece on a spindle, rotating the spindle at a target rotational speed, relatively moving a tool and the workpiece at a target moving speed to a target moving position in a cutting feed direction, that is, a so-called turning method, a rotational speed of the spindle being varied in a waveform having a predetermined amplitude and continuously varying in a periodic or non-periodic manner with respect to the target rotational speed, and the tool being continuously moved in a direction orthogonal to both an axis of the spindle and a direction of cut of the tool in synchronization with the variation of the rotational speed of the spindle at least in a predetermined time zone including a point where the rotational speed of the spindle reaches a maximal value and a predetermined time zone including a point where the rotational speed of the spindle reaches a minimal value.

Further, this machining method can be carried out appropriately by a machine tool of the present disclosure having the configuration described below.

That is, this machine tool includes a spindle retaining a workpiece, a spindle motor rotating the spindle, a feed device having a feed motor and relatively moving a tool and the workpiece in a cutting feed direction, a shift mechanism moving the tool in a shift direction orthogonal to both an axis of the spindle and a cutting direction of the tool, and a controller having a spindle motor control unit controlling the spindle motor, a feed motor control unit controlling the feed motor, and a shift control unit controlling the shift mechanism, the spindle motor control unit being configured to receive a command for a target rotational speed of the spindle and control the spindle motor to continuously vary a rotational speed of the spindle in a periodic or non-periodic manner with a predetermined amplitude with respect to the target rotational speed, the feed motor control unit being configured to receive commands for a relative target moving position and a target moving speed for the tool and the workpiece and control the feed motor to relatively move the tool and the workpiece at the received target moving speed to the target moving position, and the shift control unit being configured to control the shift mechanism in synchronization with the control of the spindle motor by the spindle motor control unit to continuously move the tool in the shift direction at least in a predetermined time zone including a point where the rotational speed of the spindle motor reaches a maximal value and a predetermined time zone including a point where the rotational speed of the spindle motor reaches a minimal value.

According to this machine tool, after a workpiece is retained by the spindle, the spindle motor is controlled by the spindle motor control unit to rotate the spindle and the feed motor of the feed device is controlled by the feed motor control unit to relatively move the workpiece and the tool in a cutting feed direction, whereby the workpiece is machined.

In this process, the spindle motor control unit receives a command for a target rotational speed of the spindle and controls the spindle motor in such a manner that the rotational speed of the spindle is continuously varied in periodic or non-periodic manner with a predetermined amplitude with respect to the target rotational speed. The control waveform for varying the rotational speed of the spindle may be a curved waveform such as a sinusoidal wave or may be a linear waveform such as a triangular wave (including a triangular wave having rounded peaks); however, it shall be a continuously varying waveform.

On the other hand, the shift control unit controls the shift mechanism in synchronization with the control of the spindle motor by the spindle motor control unit to continuously move the tool in the shift direction at least in a predetermined time zone including a point where the rotational speed of the spindle reaches a maximal value and a predetermined time zone including a point where the rotational speed of the spindle reaches a minimal value.

Thus, according to this machine tool and this machining method, similarly to the foregoing machine tool and machining method, since the rotational speed of the spindle is controlled to be continuously varied in a periodic or non-periodic manner with a predetermined amplitude with respect to a target rotational speed, self-excited chatter vibration can be sufficiently suppressed in the time zone except the predetermined time zone including the point where the rotational speed of the spindle reaches a maximal value and the predetermined time zone including the point where the rotational speed of the spindle reaches a minimal value.

On the other hand, in the predetermined time zone including the point where the rotational speed of the spindle reaches a maximal value and the predetermined time zone including the point where the rotational speed of the spindle reaches a minimal value, since the variation rate of the rotational speed of the spindle is very small, variation in cutting speed at which an edge of the tool cuts the workpiece (that is, cutting resistance) is small near the maximal value and the minimal value, which makes periodicity of variation in cutting resistance, which is one of the factors of the regeneration effect, difficult to lose. Consequently, it is difficult to sufficiently suppress self-excited chatter vibration.

Accordingly, in this machine tool, the shift mechanism is controlled by the shift control unit to continuously move the tool in the shift direction in the predetermined time zone including the point where the rotational speed of the spindle reaches a maximal value and the predetermined time zone including the point where the rotational speed of the spindle reaches a minimal value. Note that the shift direction is orthogonal to both the axis of the spindle and the direction of cut of the tool and conforms to the circumferential cutting direction of the edge of the tool.

Thus, the cutting speed of the edge of the tool (that is, the cutting resistance acting on the tool) is varied by moving the tool in the shift direction, whereby the periodicity of variation in cutting resistance, which is one of the factors of the regeneration effect, is lost and consequently self-excited chatter vibration is suppressed.

Thus, this machine tool and this machining method are also able to suppress self-excited chatter vibration more effectively than the conventional art. Note that the predetermined time zones in which the tool is moved in the shift direction can be empirically determined so that self-excited chatter vibration can be sufficiently effectively suppressed.

As described above, according to the present disclosure, self-excited chatter vibration can be suppressed more effectively as compared with the conventional art.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Specific embodiments of the present disclosure will be described below with reference to the drawings.

Figure 1:
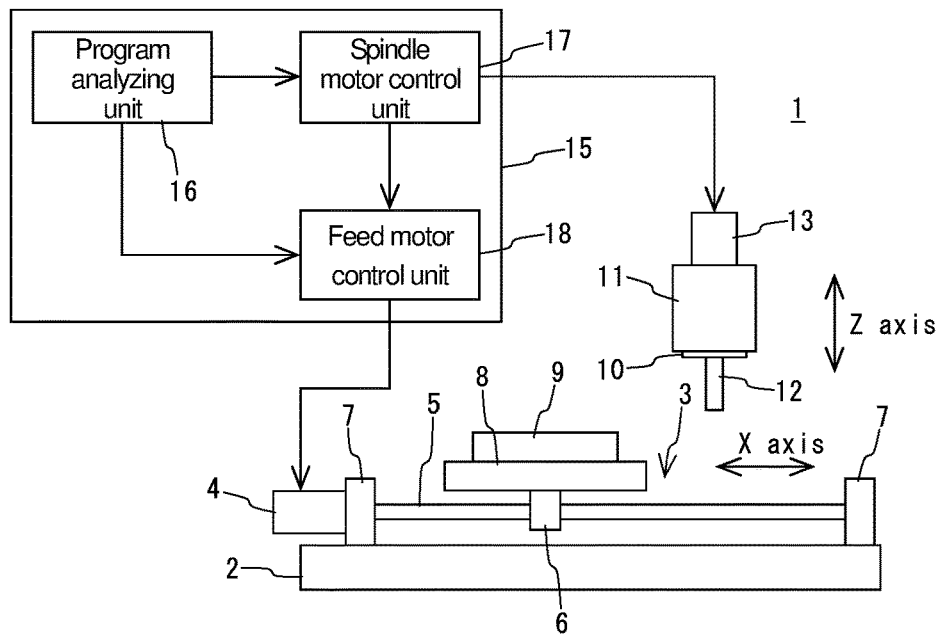
FIG. 1 is an illustration showing a schematic configuration of a machine tool according to an embodiment of the present disclosure.

FIG. 1 illustrates a schematic configuration of a machine tool according to a first embodiment. As shown in FIG. 1, the machine tool 1 of the first embodiment is a so-called vertical machining center, and includes a bed 2, an X-axis feed device 3 provided on the bed 2, a table 8 moved in an X-axis direction by the X-axis feed device 3, a spindle 10 provided above the table 8, a controller 15, and other components.

The X-axis feed device 3 is composed of a ball screw 5 disposed along the X-axis direction, a pair of bearings 7, 7 supporting both ends of the ball screw 5 in such a manner that the ball screw 5 is rotatable, an X-axis guide unit (not shown) supporting the table 8 in such a manner that the table 8 is movable in the X-axis direction, a ball nut 6 screwed with the ball screw 5 and fixed on the lower surface of the table 8, and an X-axis feed motor 4 connected to one of the ends of the ball screw 5. An action by the ball screw 5 driven by the X-axis feed motor 4 and the ball nut 6 screwed with the ball screw 5 moves the table 8 in the X-axis direction. Note that a workpiece 9 is placed and fixed on the upper surface of the table 8.

The spindle 10 is held by a spindle head 11 to be rotatable about its vertical center axis and is rotated about the center axis by a spindle motor 13 connected to an upper end of the spindle 10. A tool 12 is attached to a lower end of the spindle 10.

The spindle head 11 can be moved in a Z-axis direction (vertical direction) orthogonal to the X axis by a Z-axis feed device (not shown) having a configuration similar to that of the X-axis feed device 3 and can be moved in a Y-axis direction orthogonal to both the X axis and the Z axis (i.e., orthogonal to the drawing sheet surface) by a Y-axis feed device (not shown) having a configuration similar to that of the X-axis feed device 3.

As shown in FIG. 1, the controller 15 has a program analyzing unit 16, a spindle motor control unit 17, and a feed motor control unit 18. FIG. 1 illustrates only main components of the controller 15 and, as a matter of course, the controller 15 typically includes other components.

The program analyzing unit 16 analyzes an NC program to be executed, recognizes a command for the rotational speed of the spindle 10 designated in the NC program and transmits the recognized command as a target rotational speed to the spindle motor control unit 17, and recognizes commands for a moving position and a feed speed for the feed axes (the X axis, the Y axis, and the Z axis) and transmits the recognized commands as a target moving position and a target moving speed to the feed motor control unit 18.

The spindle motor control unit 17 receives the command for the target rotational speed for the spindle 10 from the program analyzing unit 16, and controls the spindle motor 13 in such a manner that the rotational speed of the spindle 10 is continuously varied in a periodic manner with a predetermined amplitude with respect to the target rotational speed. Note that, in this embodiment, the variation waveform of the spindle rotation speed is, as shown in FIG. 2(*a*), a triangular wave with an amplitude Wa with respect to a target rotational speed Sa; a period Ta thereof is constant.

The feed motor control unit 18 receives the commands for the target moving position and the target moving speed for the X axis, the Y axis, and the Z axis from the program analyzing unit 16 and controls a corresponding feed device (the X-axis feed device 3, the Y-axis feed device (not shown), and the Z-axis feed device (not shown)) in accordance with the received commands.

When the target moving speed input from the program analyzing unit 16 is a moving speed for cutting feed, the feed motor control unit 18 controls a corresponding feed device in synchronization with the control of the spindle motor 13 by the spindle motor control unit 17 so that the moving speed for cutting feed is continuously varied in such a manner that the ratio of the spindle rotation speed to the moving speed for cutting feed does not become constant in a predetermined time zone including a point where the rotational speed of the spindle motor 13 reaches a maximal value and a predetermined time zone including a point where the rotational speed of the spindle motor 13 reaches a minimal value.

Figure 2:
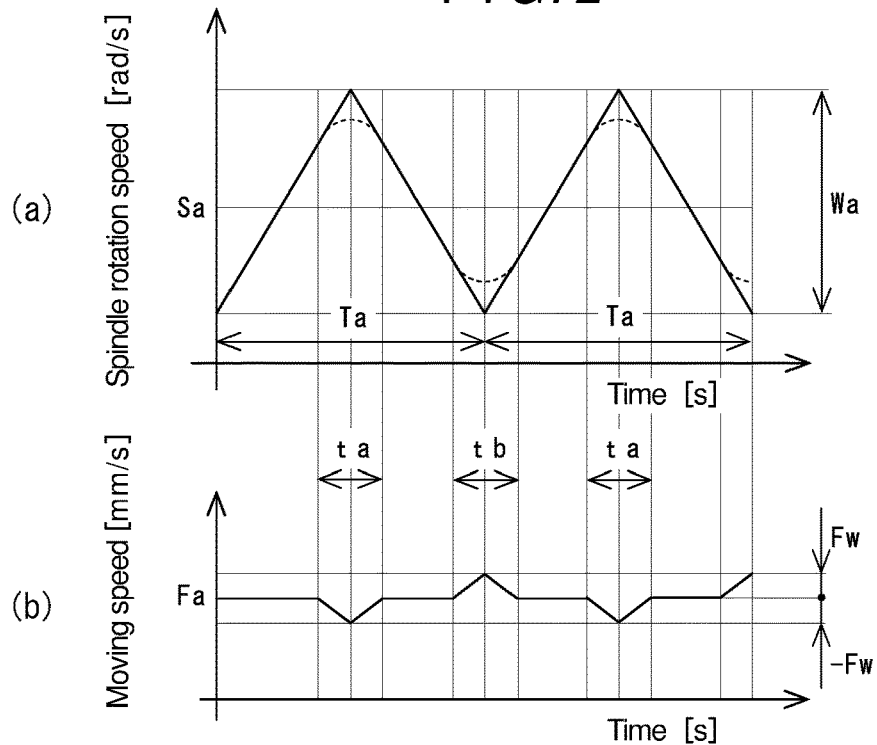
FIG. 2 is an illustration for explaining control in a spindle motor control unit and a feed motor control unit in the embodiment.

Specifically, in this embodiment, as shown in FIG. 2(*b*), the moving speed is set at the target moving speed Fa in the time zone except the predetermined time zones ta and tb, while the moving speed is varied in the form of a triangular wave having a minimal value, in other words, being convex downward, (variation width −Fw) in the predetermined time zone ta including the point where the rotational speed of the spindle motor 13 reaches the minimal value, and is varied in a triangular wave having a maximal value, in other words, being convex upward, (variation width Fw) in the predetermined time zone tb including the point where the rotational speed of the spindle motor 13 reaches the minimal value.

Note that the synchronization between the control by the feed motor control unit 18 and the control by the spindle motor control unit 17 can be realized in the following manner, for example: data for the waveform of the control executed by the spindle motor control unit 17 is stored in the feed motor control unit 18 and the feed motor control unit 18 recognizes the execution state in the spindle motor control unit 17 based on the stored data and a control signal input from the spindle motor control unit 17 and controls a corresponding feed motor in conformity with the execution state.

According to the machine tool 1 of this embodiment having the above-described configuration, after a tool 12 is retained by the spindle 10 and a workpiece 9 is placed and fixed on the table 8, the spindle motor 13, the X-axis feed motor 4, the Y-axis feed motor (not shown), and the Z-axis feed motor (not shown) are driven as appropriate in accordance with, for example, an NC program under control by the controller 15, whereby the workpiece 9 is machined.

In the case where the workpiece 9 is machined in accordance with an NC program, the program analyzing unit 16 of the controller 15 analyzes the NC program and recognizes a command for rotational speed for the spindle 10 and commands for moving position and feed speed for the feed axes (the X axis, the Y axis, and the Z axis), which commands are designated in the NC program. The program analyzing unit 16 transmits the recognized spindle rotation speed as a target rotational speed to the spindle motor control unit 17 and transmits the recognized moving position and feed speed for the feed axes as a target moving position and a target moving speed to the feed motor control unit 18.

Upon receiving the command for the target rotational speed Sa for the spindle 10 from the program analyzing unit 16, the spindle motor control unit 17 drives and control the spindle motor 13 in such a manner that the rotational speed of the spindle 10 is varied in the form of a triangular wave with the amplitude Wa and the period Ta with respect to the target rotational speed Sa. Further, the feed motor control unit 18 controls a corresponding feed motor in accordance with the target moving speed input from the program analyzing unit 16. In the case where the target moving speed is a moving speed for cutting feed, the feed motor control unit 18 controls a corresponding feed motor in synchronization with the control of the spindle motor 13 by the spindle motor control unit 17 so as to vary the moving speed as shown in FIG. 2(*b*).

Thus, controlling the spindle motor 13 and the corresponding feed motor in this way makes it possible to more effectively suppress the occurrence of self-excited chatter vibration during machining as compared with the conventional art.

That is, first, since the rotational speed of the spindle 10 is varied in the form of a triangular wave with the amplitude Wa and the period Ta with respect to the target rotational speed Sa, the variation in the spindle rotation speed is sufficiently large in the time zone except the predetermined time zone ta including the point where the spindle rotation speed reaches the maximal value and the predetermined time zone tb including the point where the spindle rotation speed reaches the minimal value. Therefore, cutting speed at which an edge of the tool 12 cuts the workpiece 9 (that is, cutting resistance acting on the tool 12) is greatly varied, whereby the periodicity of variation in cutting resistance, which is one of the factors of the regeneration effect, is lost and consequently self-excited chatter vibration is suppressed similarly to the conventional art.

On the other hand, in the predetermined time zones ta and tb, the variation rate of the spindle rotation speed is very small since the rotational speed of the spindle 10 is varied along a curve line due to tracking delay. However, since relative moving speed between the tool 12 and the workpiece 9 is varied in the form of a triangular wave having a minimal value (in other words, being convex downward) in the time period ta and is varied in a triangular wave having a maximal value (in other words, being convex upward) in the time zone tb, the cutting speed at which the edge of the tool 12 cuts the workpiece 9 (that is, the cutting resistance acting on the tool 12) is greatly varied, whereby the periodicity of variation in cutting resistance, which is one of the factors of the regeneration effect, is lost and consequently self-excited chatter vibration is effectively suppressed.

As described above, according to the machine tool 1 of this embodiment and the machining method carried out by the machine tool 1, self-excited chatter vibration can be suppressed more effectively as compared with the conventional art. In this connection, a machining simulation was carried out using a model shown in FIG. 3 (a model of the machine tool 1 shown in FIG. 1); displacement of the spindle obtained in the simulation is shown in FIG. 4.

Figure 3:
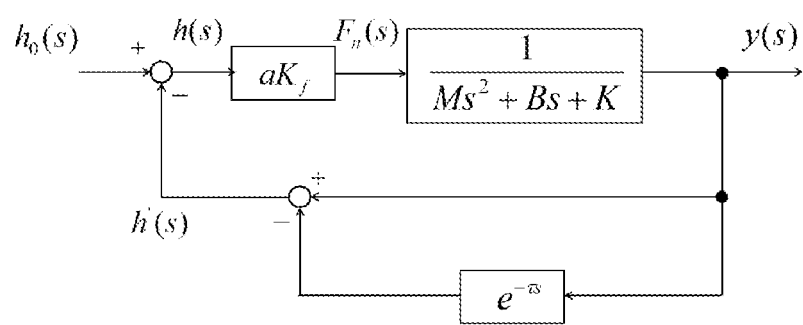
FIG. 3 is a block diagram showing a simulation model for confirming the effect of the embodiment.
Figure 4:
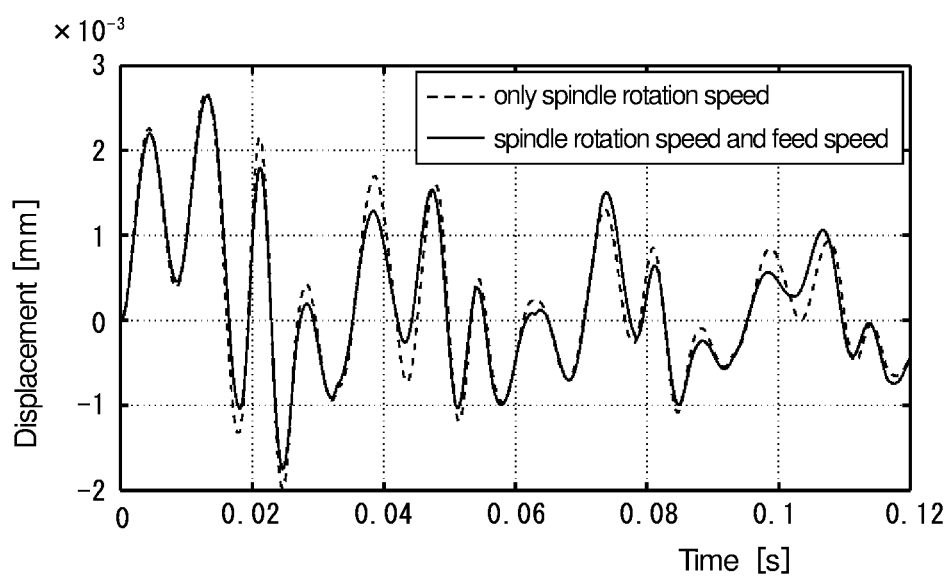
FIG. 4 is a diagram for explaining the effect of the embodiment.

Note that, in the model shown in FIG. 3, h0(s) is a determined thickness of cut, h(s) is an instantaneous thickness of cut, and y(s) is a present vibration displacement; h(s) is expressed by the following equation:

$h(s) = h0(s) + y(s) \cdot e - \tau s - y(s),$ where τ is the spindle rotation period.

Further, a is a width of cut, $K_f$ is a specific cutting resistance, $F_n(s)$ is a thrust force component of cutting force, M is a dynamic mass, B is a mechanical impedance, and K is a dynamic rigidity. In the simulation, the width of cut a is 5 [mm], the specific cutting resistance $K_f$ is 300 [MPa], the dynamic mass M is 10 Ns²/m, the mechanical impedance B is 200 Ns/m, and the dynamic rigidity K is 5×10⁵ N/m.

The machining simulation was carried out for two cases: 1) a case where only the rotational speed of the spindle was varied and the relative moving speed between the tool and the workpiece (that is, feed speed) was constant, and 2) a case where the rotational speed of the spindle was varied and the feed speed was varied in synchronization with the variation of the rotational speed of the spindle.

The rotational speed of the spindle was varied in accordance with FIG. 2(a). The target rotational speed Sa was 262 [rad/s], the period Ta was 0.171 [s], and the amplitude Wa was 78.6 [rad/s]. Note that variation in spindle rotation speed is generally evaluated by speed variation ratio RVA and speed variation period ratio RVF; they had the following values:

$RVA = Wa/Sa = 78.6/262 = 0.3;$ and $RVF = 2\pi/(Sa \cdot T) = 2\pi/(262 \times 0.171) = 0.14.$ Further, the feed speed was 2 [mm/s] in the case where it was constant, and the feed speed was varied in accordance with FIG. 2(b) in the case where it was varied in synchronization with the variation of the rotational speed of the spindle. The target moving speed (feed speed) Fa was 2 [mm/s], the variation width Fw was ±0.2 [mm/s], and the time zones ta and tb were each 0.0342 [s].

In FIG. 4, spindle displacement in the case where only the rotational speed of the spindle was varied and the feed speed was constant is indicated by a broken line and spindle displacement in the case where the rotational speed of the spindle was varied and the feed speed was varied in synchronization with the variation of the rotational speed of the spindle is indicated by a solid line. Based on FIG. 4, it is understood that varying both the rotational speed of the spindle and the feed speed as shown in FIG. 2(b) can reduce spindle displacement better, that is, can suppress spindle vibration better, than the conventional manner where only the rotational speed of the spindle is varied.

Figure 5:
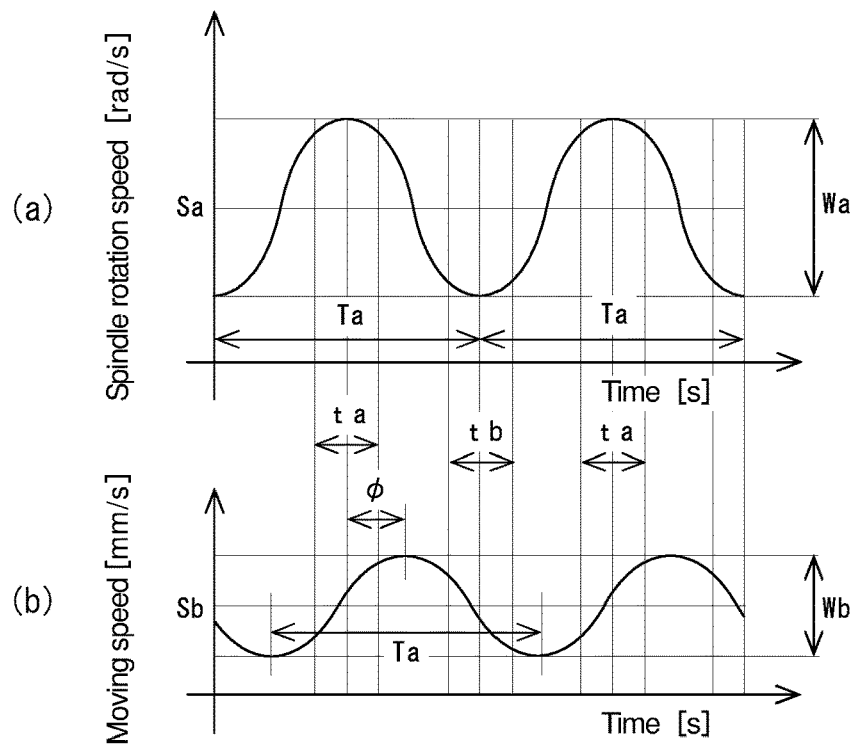
FIG. 5 is an illustration showing another control mode in the spindle motor control unit and the feed motor control unit.

Further, in the first embodiment, the spindle motor control unit 17 may be configured to vary the rotational speed of the spindle 10 in the form of a sinusoidal wave with the amplitude Wa and the period Ta with respect to the target rotational speed Sa as shown in FIG. 5(a), instead of the triangular wave shown in FIG. 2(a). Alternatively, the spindle motor control unit 17 may be configured to vary the rotational speed of the spindle 10 in a curved waveform other than a triangular wave and a sinusoidal wave or in a waveform resulting from combination of straight and curved lines. Furthermore, the spindle motor control unit 17 may be configured to vary the rotational speed of the spindle 10 in a non-periodic manner in any one of the above-mentioned waveforms. Also In these ways, self-excited chatter vibration of the spindle 10 can be suppressed similarly to the above example.

Further, the manner in which the feed motor control unit 18 varies the relative moving speed between the tool 12 and the workpiece 9 in synchronization with the control of the spindle motor 13 by the spindle motor control unit 17 is not limited to the manner shown in FIG. 2(b) and may be a variation manner as shown in FIG. 5(b). The manner shown in FIG. 5(b) is such that the relative moving speed between the tool 12 and the workpiece 9 is varied in the form of a sinusoidal wave with an amplitude Wb and a period Ta, which is the same as the variation period of the spindle rotation speed, with respect to a target moving speed Sb and the phase of the sinusoidal wave is shifted by φ with respect to the variation period of the spindle rotation speed.

Also when the variation of the relative moving speed between the tool 12 and the workpiece 9 is along such a sinusoidal wave, the cutting speed at which the edge of the tool 12 cuts the workpiece 9 can be greatly varied in the predetermined time zone ta including the point where the spindle rotation speed reaches a maximal value and the predetermined time zone tb including the point where the spindle rotation speed reaches a minimal value, whereby the periodicity of variation in cutting resistance, which is one of the factors of the regeneration effect, is lost. Therefore, similarly to the foregoing example, self-excited chatter vibration can be suppressed effectively.

Note that the variation of the relative moving speed between the tool 12 and the workpiece 9 is not limited to the examples shown in FIG. 2(b) and FIG. 5(b), another variation manner may be employed. What is required is that the relative moving speed between the tool 12 and the workpiece 9 is continuously varied in such a manner that the ratio of the spindle rotation speed to the moving speed does not become constant in the predetermined time zones ta and tb.

Further, the time zones ta and tb in which the relative moving speed between the tool 12 and the workpiece 9 is varied can be empirically determined so that self-excited chatter vibration can be sufficiently effectively suppressed.

Figure 6:
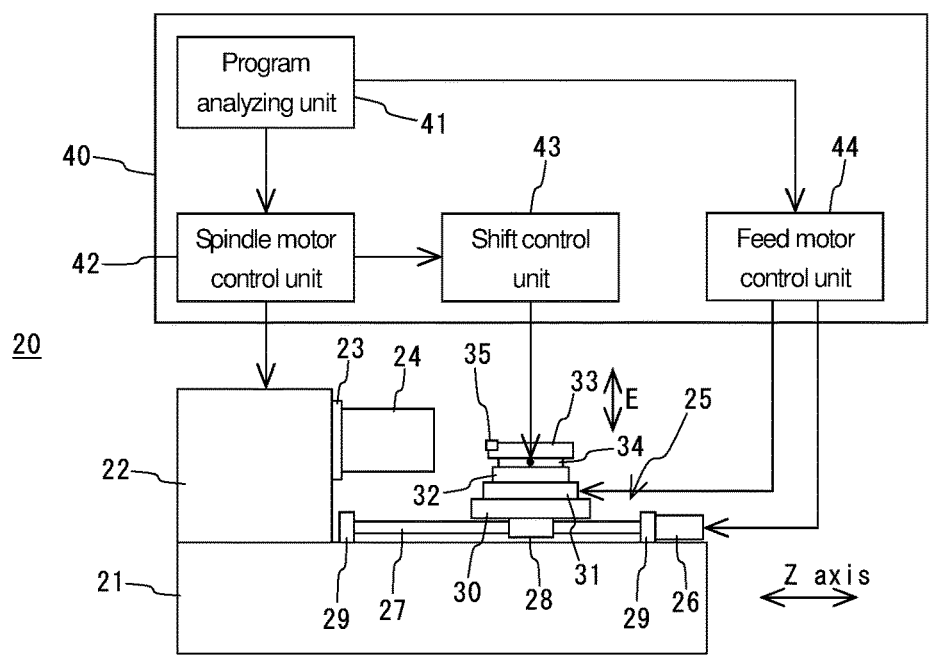
FIG. 6 is an illustration showing a schematic configuration of a machine tool according to another embodiment of the present disclosure.
Figure 7:
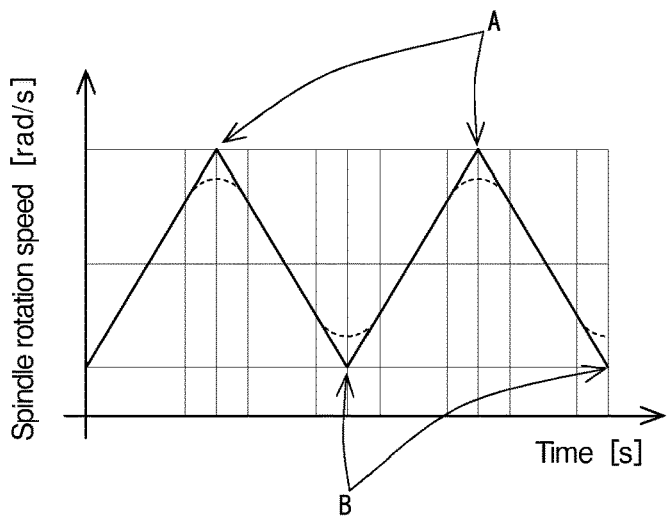
FIG. 7 is an illustration for explaining a conventional problem.
Figure 8:
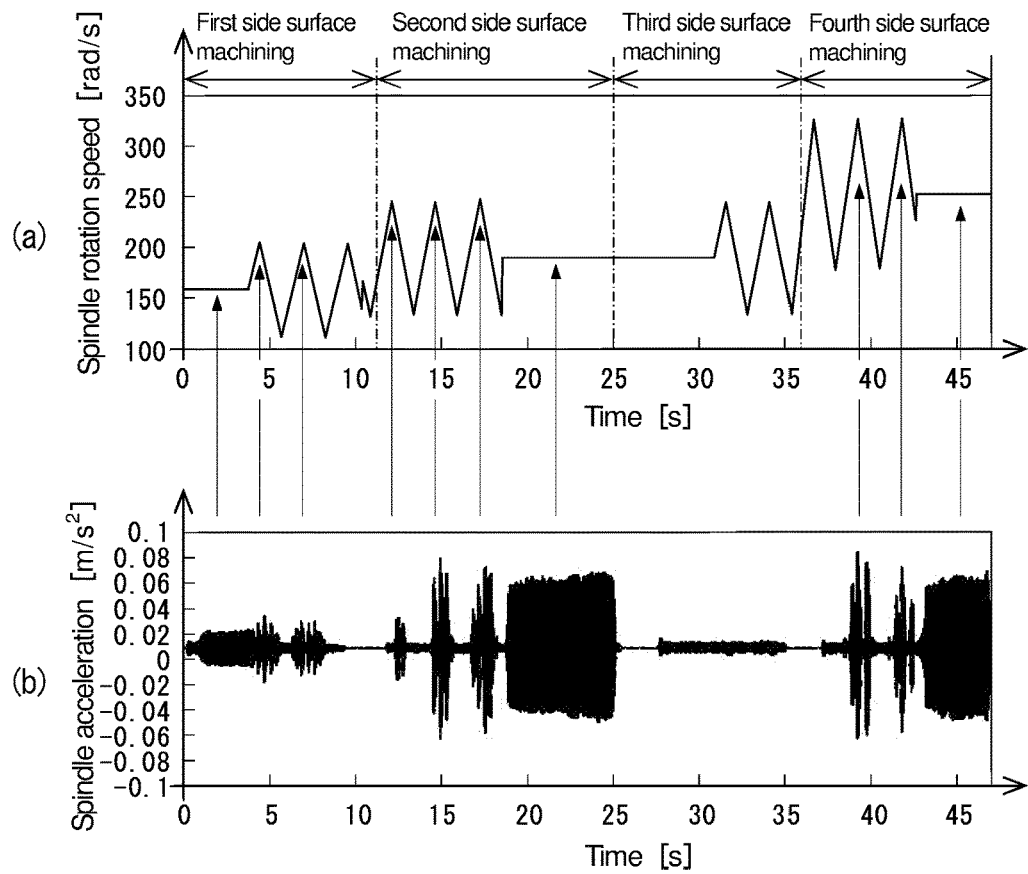
FIG. 8 is an illustration for explaining the conventional problem.
Figure 9:
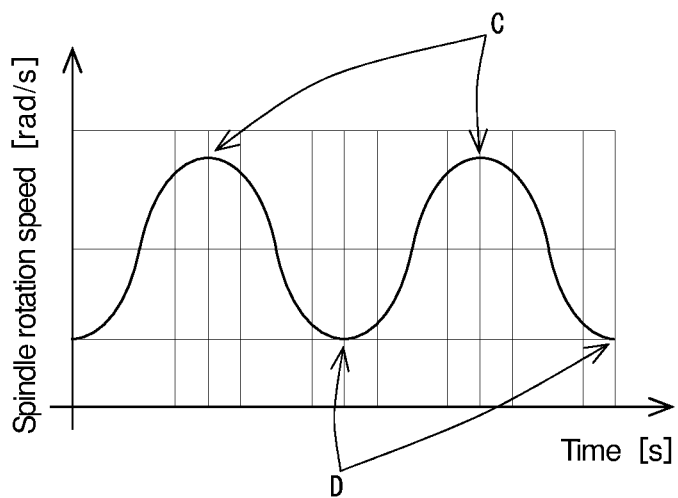
FIG. 9 is an illustration for explaining the conventional problem.

FIG. 6 illustrates a schematic configuration of a machine tool according to the second embodiment. As shown in FIG. 6, the machine tool 20 according to the second embodiment is a so-called lathe, and includes a bed 21, a headstock 22 provided on the bed 21 at the left side in the figure, a Z-axis feed device 25 provided on the bed 2 at the right side in the figure, a carriage 30 moved in a Z-axis direction by the Z-axis feed device 25, an X-axis feed device 31, a tool rest 32, a shift mechanism 34, a turret 33, a controller 40, and other components. The X-axis feed device 31, the tool rest 32, the shift mechanism 34, the turret 33 are sequentially provided on the carriage 30.

The headstock 22 holds the spindle 23 in such a manner that the spindle 23 is rotatable about its center axis, and the spindle 23 is rotated about the center axis by a spindle motor, which is not shown in the drawings. Further, an appropriate workpiece 24 is attached to the spindle 23.

The Z-axis feed device 25 is composed of a ball screw 27 disposed along the Z axis, which is parallel with the center axis of the spindle 23, a pair of bearings 29, 29 supporting both ends of the ball screw 27 in such a manner that the ball screw 27 is rotatable, a Z-axis guide unit (not shown) supporting the carriage 30 in such a manner that the carriage 30 is movable in the Z-axis direction, a ball nut 28 screwed with the ball screw 27 and fixed on the lower surface of the carriage 30, and a Z-axis feed motor 26 connected to one of the ends of the ball screw 27. An action by the ball screw 27 driven by the X-axis feed motor 26 and the ball nut 28 screwed with the ball screw 27 moves the carriage 30 in the Z-axis direction.

The X-axis feed device 31 has a configuration similar to that of the Z-axis feed device 25, and moves the tool rest 32 in an X-axis direction which is orthogonal to the Z axis (orthogonal to the drawing sheet surface). The turret 33 holds a tool 35 and is disposed on the tool rest 32 with the shift mechanism 34 between the turret 33 and the tool rest 32. The shift mechanism 34 includes an appropriate actuator and moves the turret 33 up and down by a predetermined distance in a direction orthogonal to both the Z axis and the X axis, that is, in the arrow E direction (vertical direction).

As shown in FIG. 6, the controller 40 has a program analyzing unit 41, a spindle motor control unit 42, a shift control unit 43, and a feed motor control unit 44; FIG. 6 illustrates only main components of the controller 40 and, as a matter of course, the controller 40 typically has other components.

The program analyzing unit 41 analyzes an NC program to be executed, recognizes a command for rotational speed for the spindle 23 designated in the NC program and transmits the recognized command as a target rotational speed to the spindle motor control unit 42, and recognizes commands for moving position and feed speed for the feed axes (the X axis and the Z axis) and transmits the recognized commands as a target moving position and a target moving speed to the feed motor control unit 44.

The spindle motor control unit 42 receives the command for the target rotational speed of the spindle 23 from the program analyzing unit 41 and controls the spindle motor (not shown) in such a manner that the rotational speed of the spindle 23 is continuously varied with a predetermined amplitude with respect to the target rotational speed. Note that, also in this embodiment, the spindle rotation speed may be varied in the form of a triangular wave as shown in FIG. 2(a), a sinusoidal wave as shown in FIG. 5(a), a waveform other than them, or a waveform formed by combination of straight and curved lines, and the variation may be periodic or non-periodic.

The feed motor control unit 44 receives the commands for the target moving position and the target moving speed for the X axis and the Z axis from the program analyzing unit 41 and controls a corresponding feed device (the X-axis feed device 31 and the Z-axis feed device 25) in accordance with the received command.

Further, the shift control unit 43 receives a control signal from the feed motor control unit 44, and in the case where the feed motor control unit 44 is executing control for cutting feed, the shift control unit 43 controls the shift mechanism 34 in synchronization with the control of the spindle motor (not shown) by the spindle motor control unit 42. At least in a predetermined time zone including a point where the rotational speed of the spindle motor (not shown) reaches a maximal value (for example, the time zones ta shown in FIG. 2(a) and FIG. 5(a)) and a predetermined time zone including a point where the rotational speed of the spindle motor (not shown) reaches a minimal value (for example, the time zones tb shown in FIG. 2(a) and FIG. 5(b)), the turret 33 including the tool 35 is moved in the shift direction. There are some possible manners of moving the turret 33; specifically, the turret 33 may be continuously moved upward at a predetermined speed in the time zone ta and continuously moved downward at a predetermined speed in the time zone tb, or the turret 33 may be continuously moved up and down at a predetermined speed in both of the time zones ta and tb.

Note that, also in this embodiment, the synchronization between the control in the shift control unit 43 and the control in the spindle motor control unit 42 can be realized, for example, in the following manner: data for the waveform of the control executed by the spindle motor control unit 42 is stored in the shift control unit 43 and the shift control unit 43 recognizes the execution state in the spindle motor control unit 42 based on the stored data and a control signal input form the spindle motor control unit 42 and controls the shift mechanism 34 in conformity with the execution state.

According to the machine tool 20 of this embodiment having the above-described configuration, after a workpiece 24 is retained by the spindle 23 and a tool 35 is attached to the turret 33, the spindle motor (not shown), the X-axis feed motor (not shown), and the Z-axis feed motor 26 are driven as appropriate in accordance with, for example, an NC program under control by the controller 40, whereby the workpiece 24 is machined.

Further, similarly to the first embodiment, in the case where the workpiece 24 is machined in accordance with an NC program, the program analyzing unit 41 of the controller 40 analyzes the NC program and recognizes a command for rotational speed for the spindle 23 and commands for moving position and feed speed for the feed axes (the X axis and the Z axis), which are designated in the NC program. The program analyzing unit 41 transmits the recognized spindle rotation speed as a target rotational speed to the spindle motor control unit 42 and transmits the recognized moving position and feed speed for the feed axes as a target moving position and a target moving speed to the feed motor control unit 44.

Upon receiving the command for the target rotational speed of the spindle 23 from the program analyzing unit 41, the spindle motor control unit 42 drives and controls the spindle motor (not shown) in such a manner that the rotational speed of the spindle 23 is varied in the above-described variation waveform.

On the other hand, upon receiving the commands for the target moving position and the target moving speed, the feed motor control unit 44 controls a feed motor of a corresponding feed device in such a manner that the tool 35 and the workpiece 24 are relatively moved at the received target moving speed to the target moving position.

Further, when the feed motor control unit 44 is executing control for cutting feed, the shift control unit 43 controls the shift mechanism 34 in synchronization with the control of the spindle motor (not shown) by the spindle motor control unit 42, whereby the turret 33 including the tool 35 is moved in the shift direction (the arrow E direction) in a predetermined time zone including a point where the rotational speed of the spindle motor (not shown) reaches a maximal value and a predetermined time zone including a point where the rotational speed of the spindle motor (not shown) reaches a minimal value.

Thus, controlling the spindle motor (not shown) and the shift mechanism as described above makes it possible to suppress the occurrence of self-excited chatter vibration during machining more effectively as compared with the conventional art.

That is, first, since the rotational speed of the spindle 23 is continuously varied in a periodic or non-periodic manner with a predetermined amplitude with respect to a target rotational speed, variation in the spindle rotation speed sufficiently large in the time zone except a predetermined time zone including a point where the spindle rotation speed reaches a maximal value and a predetermined time zone including a point where the spindle rotation speed reaches a minimal value. Therefore, cutting speed at which an edge of the tool 35 cuts the workpiece 24 (that is, cutting resistance acting on the tool 35) is greatly varied, whereby the periodicity of variation in cutting resistance, which is one of the factors of the regeneration effect, is lost and consequently self-excited chatter vibration is suppressed similarly to the conventional art.

On the other hand, in the predetermined time zones, the variation rate of the rotational speed of the spindle 23 is very small since the spindle rotation speed is varied along a curve. However, in these time zones, since the tool 35 is moved in the direction (indicated by the arrow E) orthogonal to both the axis of the spindle 23 and the direction of cut of the tool 35, that is, in a direction conforming to the circumferential direction of cutting by the edge of the tool 35, this movement makes it possible to vary the cutting speed by the edge of the tool 35 (that is, cutting resistance acting on the tool 35). Thereby, the periodicity of variation in cutting resistance, which is one of the factors of the regeneration effect, is lost and consequently self-excited chatter vibration is suppressed.

Thus, this machine tool and this machine method are also able to suppress self-excited chatter vibration more effectively than the conventional art. Note that the predetermined time zones in which the tool 35 is moved in the arrow E direction can be empirically determined so that self-excited chatter vibration can be sufficiently effectively suppressed.

Thus, specific embodiments of the present disclosure have been described; however, the present disclosure is not limited to or restricted to these embodiments and may be implemented in other modes.

What is claimed is:

1. A method of machining a workpiece with a machine tool, comprising:
   retaining a tool on a spindle;
   rotating the spindle at a target rotational speed; and
   relatively moving the workpiece and the tool at a target moving speed to a target moving position in a cutting feed direction, wherein:
      a rotational speed of the spindle is varied in a waveform having a predetermined amplitude and continuously changing in a periodic or non-periodic manner with respect to the target rotational speed; and
      a relative moving speed between the tool and the workpiece is continuously varied in synchronization with the variation of the rotational speed of the spindle such that a ratio of the rotational speed of the spindle to the relative moving speed is not constant, at least in a predetermined time zone including a point where the rotational speed of the spindle reaches a maximal value and a predetermined time zone including a point where the rotational speed of the spindle reaches a minimal value.

2. The method of claim 1, wherein the waveform is a triangular waveform and the relative moving speed between the tool and the workpiece is varied in a triangular waveform in the predetermined time zones.

3. The method of claim 1, wherein the waveform is a sinusoidal waveform and the relative moving speed between the tool and the workpiece is varied in a sinusoidal waveform in the predetermined time zones.

* * * * *